(12) United States Patent  
Oxford et al.

(10) Patent No.: US 10,386,801 B2  
(45) Date of Patent: Aug. 20, 2019

(54) METHODS OF FORMING AND METHODS OF REPAIRING EARTH-BORING TOOLS

(71) Applicant: Baker Hughes, a GE company, Houston, TX (US)

(72) Inventors: James Andy Oxford, Magnolia, TX (US); Gregory D. Folks, The Woodlands, TX (US); Christoph Wangenheim, Hemmingen (DE)

(73) Assignee: Baker Hughes, a GE Company, LLC, Houston, TX (US)

( * ) Notice: Subject to any disclaimer, the term of this patent is extended or adjusted under 35 U.S.C. 154(b) by 245 days.

(21) Appl. No.: 15/227,261

(22) Filed: Aug. 3, 2016

(65) Prior Publication Data

US 2017/0037518 A1    Feb. 9, 2017

Related U.S. Application Data

(63) Continuation-in-part of application No. 14/816,758, filed on Aug. 3, 2015, now Pat. No. 9,890,595.

(51) Int. Cl.
*E21B 10/46* (2006.01)
*G05B 15/02* (2006.01)
(Continued)

(52) U.S. Cl.
CPC .......... *G05B 15/02* (2013.01); *B23K 15/0086* (2013.01); *B23K 15/0093* (2013.01);
(Continued)

(58) Field of Classification Search
CPC ............... G05B 15/02; G05B 19/4093; G05B 19/40937; B33Y 10/00; B23K 15/0086;
(Continued)

(56) References Cited

U.S. PATENT DOCUMENTS

| 5,182,170 A | 1/1993 | Marcus et al. |
| 6,036,777 A | 3/2000 | Sachs |

(Continued)

FOREIGN PATENT DOCUMENTS

| GB | 2486046 A | 6/2012 |
| GB | 2486046 B | 12/2012 |

(Continued)

OTHER PUBLICATIONS

Palaniswamy et al., Additive Manufacturing by Direct Metal Deposition, Advanced Materials & Processes, May 2011, pp. 33-36.

(Continued)

*Primary Examiner* — Omar Flores Sanchez
(74) *Attorney, Agent, or Firm* — TraskBritt

(57) ABSTRACT

A method of forming at least a portion of an earth-boring tool using an electronic representation of at least one geometric feature of at least a component of an earth-boring tool stored in memory accessible by a processor operatively connected to a multi-axis positioning system, a direct metal deposition apparatus, and a material removal apparatus. The processor generates a deposition path for the direct metal deposition apparatus is based at least in part on the electronic representation of the at least one geometric feature of the at least a component of the earth-boring tool. The direct metal deposition tool is operated according to the generated deposition path to deposit metal material on an earth-boring tool component coupled to the multi-axis positioning system to at least partially form the at least one geometric feature of the earth-boring tool. Methods also include methods of repairing earth-boring tools.

20 Claims, 8 Drawing Sheets

(51) Int. Cl.
*B33Y 10/00* (2015.01)
*B23K 26/34* (2014.01)
*C23C 24/10* (2006.01)
*E21B 10/43* (2006.01)
*B23K 15/00* (2006.01)
*G05B 19/4093* (2006.01)
*B23K 101/20* (2006.01)
*B23K 103/18* (2006.01)

(52) U.S. Cl.
CPC .............. *B23K 26/34* (2013.01); *B33Y 10/00* (2014.12); *C23C 24/103* (2013.01); *C23C 24/106* (2013.01); *E21B 10/43* (2013.01); *G05B 19/4093* (2013.01); *G05B 19/40937* (2013.01); *B23K 2101/20* (2018.08); *B23K 2103/26* (2018.08); *G05B 2219/32228* (2013.01); *G05B 2219/45129* (2013.01); *Y02P 90/265* (2015.11)

(58) Field of Classification Search
CPC .. B23K 15/0093; B23K 26/34; C23C 24/103; C23C 24/106; E21B 10/43
See application file for complete search history.

(56) References Cited

U.S. PATENT DOCUMENTS

| | | |
|---|---|---|
| 6,209,420 B1 | 4/2001 | Butcher et al. |
| 6,596,224 B1 | 7/2003 | Sachs et al. |
| 6,656,410 B2 | 12/2003 | Hull et al. |
| 6,676,892 B2 | 1/2004 | Das et al. |
| 6,680,456 B2 | 1/2004 | Adams |
| 6,694,207 B2 | 2/2004 | Darrah et al. |
| 6,811,744 B2 | 11/2004 | Keicher et al. |
| 6,861,612 B2 | 3/2005 | Bolton et al. |
| 7,259,353 B2 | 8/2007 | Guo |
| 7,765,022 B2 | 7/2010 | Mazumder et al. |
| 8,344,283 B2 | 1/2013 | Watanabe |
| 8,568,124 B2 | 10/2013 | Brunermer |
| 8,826,938 B2 | 9/2014 | Moore |
| 2002/0035895 A1 | 3/2002 | Davies et al. |
| 2003/0094730 A1 | 5/2003 | Dourfaye et al. |
| 2005/0056628 A1 | 3/2005 | Hu |
| 2005/0225007 A1 | 10/2005 | Lai et al. |
| 2007/0157763 A1 | 7/2007 | Oldham |
| 2008/0124423 A1 | 5/2008 | Peterson et al. |
| 2010/0104736 A1 | 4/2010 | Luce et al. |
| 2012/0193148 A1 | 8/2012 | Overstreet et al. |
| 2013/0149552 A1 | 6/2013 | Yao et al. |
| 2013/0273258 A1 | 10/2013 | Luce et al. |
| 2013/0310961 A1 | 11/2013 | Intriago Velez |
| 2013/0320598 A1 | 12/2013 | Atkins et al. |
| 2014/0035205 A1 | 2/2014 | Hagiwara et al. |
| 2014/0163717 A1 | 6/2014 | Das et al. |
| 2014/0209577 A1 | 7/2014 | Bruck et al. |
| 2014/0302188 A1 | 10/2014 | Rix et al. |
| 2014/0305529 A1 | 10/2014 | Kroll et al. |
| 2015/0299825 A1 | 10/2015 | Poole et al. |
| 2016/0271732 A1 | 9/2016 | Dutta |
| 2017/0037518 A1 | 2/2017 | Oxford et al. |

FOREIGN PATENT DOCUMENTS

| | | |
|---|---|---|
| WO | 2008046039 A2 | 4/2008 |
| WO | 2013087515 A1 | 6/2013 |
| WO | 2014083277 A1 | 6/2014 |
| WO | 2014154748 A1 | 10/2014 |

OTHER PUBLICATIONS

Chinese First Search Report for Chinese Application No. 201680056443.X, dated Jan. 29, 2019, 2 pages.
Chinese First Office Action for Chinese Application No. 201680056443.X, dated Feb. 11, 2019, 13 pages with English Translation.

METHODS OF FORMING AND METHODS OF REPAIRING EARTH-BORING TOOLS

CROSS-REFERENCE TO RELATED APPLICATION

This application is a continuation-in-part of U.S. patent application Ser. No. 14/816,758, filed Aug. 3, 2015, now U.S. Pat. No. 9,890,595, issued Feb. 13, 2018 the disclosure of which is incorporated herein in its entirety by this reference.

TECHNICAL FIELD

Embodiments of the present disclosure relate to methods of forming and methods of repairing earth-boring tools including additive and subtractive manufacturing processes.

BACKGROUND

Earth-boring tools are used to form boreholes (e.g., wellbores) in subterranean formations. Such earth-boring tools include, for example, drill bits, reamers, mills, etc. For example, a fixed-cutter earth-boring rotary drill bit (often referred to as a "drag" bit) generally includes a plurality of cutting elements secured to a face of a bit body of the drill bit. The cutters are fixed in place when used to cut formation materials. A conventional fixed-cutter earth-boring rotary drill bit includes a bit body having generally radially projecting and longitudinally extending blades. During drilling operations, the drill bit is positioned at the bottom of a well borehole and rotated.

Earth-boring tool bodies, such as drag bits, may have complex internal and external geometry including, e.g., internal fluid passageways and external blades with pockets for cutting elements. Earth-boring tool bodies may be formed from metal alloys such as steel, stainless steel, or other alloys. Such bits may, for example, be formed by machining (e.g., milling, turning) a metal blank to the desired geometry. To enhance the longevity of a metal alloy bit body in abrasive downhole environments, wear-resistant materials may be applied to high-wear areas of the bit body, such as the blade surfaces, gage surfaces, junk slots (i.e., fluid courses between blades), and areas adjacent the cutter pockets. Examples of wear-resistant materials may include multi-phase materials, e.g., hard material particles dispersed within a metal alloy matrix, or may include substantially homogenous metal alloys, such as cobalt-chromium alloys. The wear-resistant material may be applied by, for example, melting a rod comprising the wear resistant material with a torch or other heat source adjacent the areas of the tool body over which the wear-resistant material is desired.

BRIEF SUMMARY

In one embodiment, a method of forming at least a portion of an earth-boring tool comprises entering an electronic representation of at least one geometric feature of at least a component of an earth-boring tool in a computer system including memory and a processor, the computer system operatively connected to a multi-axis positioning system, a direct metal deposition tool, and a material removal tool. The processor generates a first tool path for the direct metal deposition tool. The first tool path is based at least in part on the electronic representation of the at least one geometric feature of the at least a component of the earth-boring tool. The direct metal deposition tool is operated along the first tool path to deposit metal on an earth-boring tool component coupled to the multi-axis positioning system to at least partially form the at least one geometric feature of the earth-boring tool. The processor generates a second tool path for the material removal tool, the second tool path based at least in part on the electronic representation of the at least one geometric feature of the earth-boring tool. The material removal tool is operate along the second tool path to remove at least a portion of the deposited metal from the at least one geometric feature of the at least a component of the earth-boring tool.

In another embodiment, a method of forming a rotary drag bit comprises entering an electronic representation of a rotary drag bit in a computer system of a multi-axis milling machine, the computer system comprising memory and a processor. A metal blank is affixed to a multi-axis positioner of the multi-axis milling machine. Material is removed from the metal blank by operating a milling tool along a milling tool path determined by the processor of the multi-axis milling machine based at least in part on the electronic representation of the rotary drag bit to form a shank of the rotary drag bit including a threaded portion for connection to a drill string. Metal material is deposited on the shank of the rotary drag bit by operating a direct metal deposition tool along a first deposition tool path determined by the processor of the multi-axis milling machine based at least in part on the electronic representation of the rotary drag bit to form a geometric feature of the rotary drag bit including at least a portion of a blade on the shank of the rotary drag bit. A hardfacing material is deposited on the at least a portion of the blade of the rotary drag bit by operating a direct metal deposition tool along a hardfacing tool path determined by the processor of the multi-axis milling machine based at least in part on the electronic representation of the rotary drag bit to form at least one hardfaced area on the at least a portion of the blade of the rotary drag bit.

In yet another embodiment, a method of repairing an earth-boring tool comprises generating an electronic representation of the shape of a worn earth-boring tool. Using a computer system, the electronic representation of the shape of the worn earth-boring tool is compared to an electronic representation of a shape of the earth-boring tool in an unworn state based on design specifications associated with the earth-boring tool to identify worn areas of the earth-boring tool. Using a computer system, a tool path is generated based on a difference between the compared shape of the worn earth-boring tool and the shape of the earth-boring tool in an unworn state based on the design specifications of the earth-boring tool. A direct metal deposition tool is operated along the tool path to build up worn areas of the worn earth-boring tool to meet the design specifications.

A method of altering at least one dimension of at least a portion of an earth-boring tool using an electronic representation of at least one geometric feature of at least a portion of a component of an earth-boring tool using a multi-axis positioning system, a direct metal deposition apparatus, and a material removal apparatus, the method comprising generating, with a processor and based at least in part on the electronic representation, a deposition path for deposition of metal material by the direct metal deposition apparatus, depositing metal material according to the generated deposition path using the direct metal deposition apparatus on an earth-boring tool component related to the electronic representation and coupled to the multi-axis positioning, generating, with the processor and based at least in part on the electronic representation, a removal path for the material removal apparatus and removing at least a portion of the deposited metal material according to the generated removal path using the material removal apparatus from the earth-boring tool.

BRIEF DESCRIPTION OF THE DRAWINGS

While the specification concludes with claims particularly pointing out and distinctly claiming what are regarded as embodiments of the present disclosure, various features and advantages of disclosed embodiments may be more readily ascertained from the following description when read with reference to the accompanying drawings, in which:

DETAILED DESCRIPTION

The illustrations presented herein are not actual views of any particular method, apparatus, or earth-boring tool component, but are merely idealized representations employed to describe embodiments of the disclosure. Additionally, elements common between figures may retain the same numerical designation.

The disclosure relates to methods of forming earth-boring tools using direct metal deposition manufacturing processes. For example, the disclosure relates to layer-by-layer application of metal material on surfaces of earth-boring tool components. In some embodiments, direct metal deposition processes may be used to form earth-boring tool components. In some embodiments, direct metal deposition processes may be used to apply material to partially formed earth-boring tool components (e.g., blanks including the shank of a rotary drill bit). In some embodiments, direct metal deposition processes may be used to repair earth-boring tool components by applying material to a worn portion of the earth-boring tool component.

As used herein, the term "direct metal deposition" means and includes any additive manufacturing processes in which material is applied to a component by at least partially melting a portion of the component to form a melt pool, introducing additional material to the melt pool, at least partially melting the additional material, and re-solidifying the melt pool and the additional material to form a raised feature on the component. As used herein, the term "direct metal deposition" further means and includes any additive manufacturing processes in which material is applied to a component by applying heat to a portion of the component, introducing additional material to heated portion of the component, at least partially melting the additional material, and re solidifying the additional material to form a raised feature on the component.

As used herein, the term "earth-boring tool" means and includes any portion or component of a tool configured for use in formation degradation, e.g., drilling or enlarging boreholes for oil or gas production, geothermal wells, mining, etc. Such tools may include, without limitation, rotary drag bits, roller cone drill bits, hybrid bits, reamer components such as reamer blades, and other tools.

Figure 1:
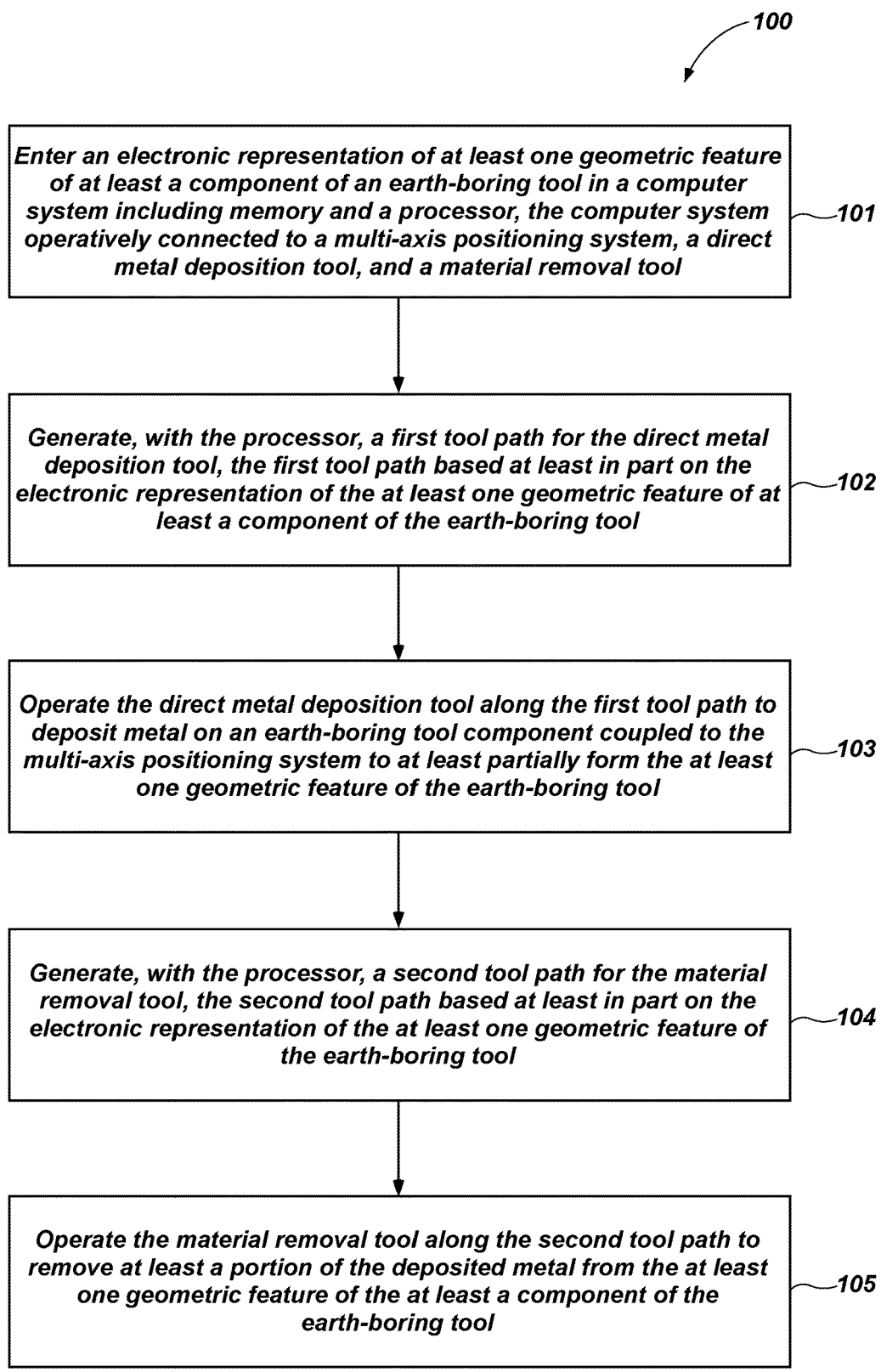
FIG. 1 is a process flow chart showing process acts of a method of forming an earth-boring tool according to an embodiment of the disclosure.

FIG. 1 illustrates a flow chart of a non-limiting example method 100 of forming a portion of an earth-boring tool according to an embodiment of the disclosure. In act 101, an electronic representation of at least one geometric feature of at least a component of an earth-boring tool is entered in a computer system including a memory and a processor, the computer system operatively connected to at least one of a multi-axis positioning system, a direct metal deposition tool (which may also be characterized as a direct metal deposition apparatus), and a material removal tool, which may also be characterized as a material removal apparatus). In act 102, the processor generates a first tool path, which may be characterized as a deposition path, for the direct metal deposition tool. The first tool path is based at least in part on the electronic representation of the at least one geometric feature of the at least a component of the earth-boring tool. In act 103, the direct metal deposition tool is operated along the first tool path, according to the generated deposition path, to deposit metal on an earth-boring tool component coupled to the multi-axis positioning system to at least partially form the at least one geometric feature of the earth-boring tool. In act 104, the processor generates a second tool path, which may be characterized as a removal path, for the material removal tool. The second tool path is based at least in part on the electronic representation of the geometric feature. In act 105, the material removal tool is operated along the second tool path, according to the generated removal path, to remove at least a portion of the deposited metal from the at least one geometric feature of at least a component of the earth-boring tool.

Figure 2:
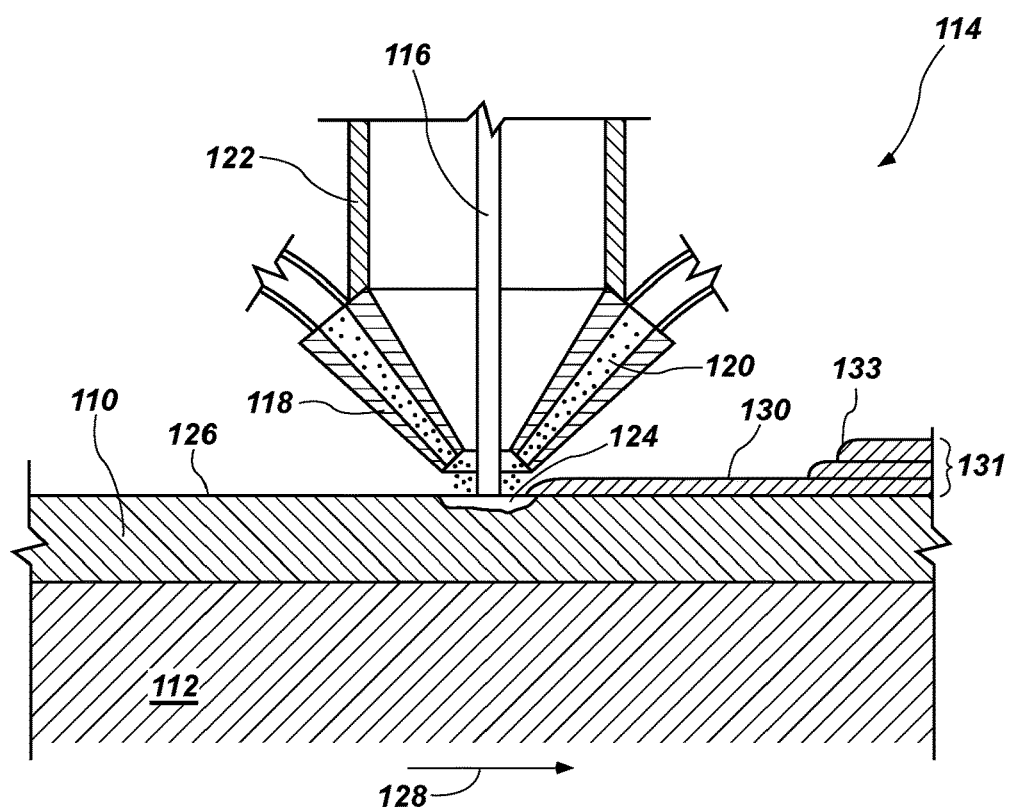
FIG. 2 is a side cross-sectional view of a direct metal deposition process according to an embodiment of the disclosure.

FIG. 2 illustrates a simplified cross-sectional view of an embodiment of a direct metal deposition process used to form a portion of an earth-boring tool. An earth-boring tool component 110 may be affixed to a machine tool component configured to position and/or manipulate a workpiece, such as a multi-axis positioner 112. As a specific, non-limiting example, the multi-axis positioner 112 may be a component of a multi-axis, computer-numeric-control (CNC) machine tool. In other words, the multi-axis positioner 112 may be operatively (e.g., mechanically, electrically) coupled to the multi-axis machine tool. The multi-axis machine tool may include a CNC processor (not shown) programmed to read an electronic file representing a three-dimensional model of an earth boring tool, and to generate tool paths based at least in part on the three-dimensional model for one or more machine tools (e.g., additive manufacturing tools, subtractive manufacturing tools) operatively connected to the multi-axis positioner 112, as described below. The additive manufacturing tools and subtractive manufacturing tools may be operated along respective tool paths to form geometric features of the earth-boring tool. The tool paths may include movement (e.g., linear movement in direction 128) of the multi-axis positioner 112, which may be controlled by the CNC processor through motors (e.g., stepper motors), linear actuators, or other electromechanical devices.

The earth-boring tool component 110 may be, e.g., a portion of an earth-boring drill bit (e.g., a drag bit, a roller cone bit, a hybrid bit, etc.), a portion of a borehole enlarging device (e.g., a reamer blade), or any other component of an earth-boring tool, or of another downhole tool or assembly for use in a borehole. The earth-boring tool component 110 may comprise a metal alloy, such as steel, stainless steel, a nickel-based alloy, or other metal alloys. In some embodiments, the earth-boring tool component 110 may comprise a particle-matrix composite material, such as particles of cemented tungsten carbide dispersed within a metal alloy matrix (e.g., a bronze matrix).

An additive manufacturing device may be operatively coupled (e.g., mechanically and/or electrically coupled) to the multi-axis positioner 112. As non-limiting examples, the additive manufacturing tool may be or include one or more tools configured to implement direct metal deposition, micro-plasma powder deposition, selective laser melting, selective laser sintering, electron beam melting, electron beam freeform fabrication, and other additive manufacturing processes. In the embodiment shown in FIG. 2, the additive manufacturing tool is a direct metal deposition tool 114. The direct metal deposition tool 114 may include a heat source 116 and one or more deposition nozzles 118 may be positioned adjacent the earth-boring tool component 110. The heat source 116 may comprise a laser, an electron beam, plasma arc, or any other suitable heat source. In the embodiment shown in FIG. 2, the heat source 116 is a $CO_2$ laser. In another embodiment, the heat source 116 may be separate and distinct from the direct metal deposition tool and be independently positionable with respect to the earth-boring tool component 110 for optimal selective heating of a portion of the surface of the earth-boring tool component 110.

The one or more deposition nozzles 118 may be configured to deliver material for deposition on the earth-boring tool component 110. For example, the one or more deposition nozzles 118 may be operably connected to one or more reservoirs (not shown) containing powdered metal material 120. In some embodiments, a fluid medium may be used to deliver the powdered metal material 120 from the one or more reservoirs through the one or more deposition nozzles 118. For example, particles of the powdered metal material 120 may be entrained within a flow of inert gas (e.g., argon) and delivered by the flow of inert gas through the one or more deposition nozzles 118. In other embodiments, metallic material may be delivered in non-powdered form, e.g., as a wire or rod of material.

The heat source 116 and the one or more deposition nozzles 118 may be affixed to a gantry 122 positioned adjacent the multi-axis positioner 112. In some embodiments, the gantry 122 may include computer-numeric-control (CNC) capability. For example, the gantry 122 may be configured to enable linear movement of the direct metal deposition tool 114 in one or more linear directions and rotational movement of the direct metal deposition tool 114 about one or more axes. In some embodiments, the gantry 122 may be affixed to electromechanical devices, e.g., stepper motors, linear actuators, etc., that are operatively connected to the CNC processor and move the gantry 122 and the direct metal deposition tool 114 along a tool path generated by the CNC processor based on the three-dimensional model of the earth-boring tool.

During operation of the direct metal deposition tool 114, the heat source 116 may initiate a melt pool 124 by heating a localized portion of a surface 126 of the earth-boring tool component 110 to a melting temperature of a material of the surface of the earth-boring tool component 110. The one or more deposition nozzles 118 may deliver particles of powdered metal material 120 to the melt pool 124. The particles of powdered metal material 120 may at least partially melt upon contact with the melt pool 124, or may at least partially melt when in proximity to one or both of the melt pool 124 and the heat source 116. Subsequent solidification of the melt pool 124 after the addition of the powdered metal material 120 results in build-up of the surface 126 of the earth-boring tool component 110. In other words, the direct metal deposition process illustrated in FIG. 2 results in additional material 130 being deposited on the surface 126 of the earth-boring tool component 110. The additional material 130 deposited on the surface 126 of the earth-boring tool component 110 may be characterized as a "layer" of additional material. However, as the powdered metal material 120 may be completely melted and incorporated in the melt pool 124 in some embodiments, the additional material 130 and the material of the earth-boring tool component 110 may be substantially homogenous.

The amount of additional material 130 deposited in one pass by the direct metal deposition tool 114 may be varied by changing operational parameters of the direct metal deposition tool 114, the gantry 122, and the multi-axis positioner 112. For example, the amount of additional material 130 deposited in one pass may be adjusted by altering the flow rate of the powdered metal material 120 and/or a rate of travel of the surface 126 of the earth-boring tool component 110 with respect to the direct metal deposition tool 114 (e.g., one or both of a rate of travel of the multi-axis positioner 112 and a rate of travel of the gantry 122). A desired final geometry may be imparted to the earth-boring tool component 110 by applying material to the earth-boring tool component 110 by making one or more passes with the direct metal deposition tool 114 to build up various surfaces and features. Stated differently, the direct metal deposition tool 114 may be used to impart one or more geometric features 131 to the surface 126 of the earth-boring tool component 110 by depositing or more layers of additional material 130 on the surface of the earth-boring tool component 110. The one or more geometric features formed by the direct metal deposition tool 114 may be fully dense on completion of the direct metal deposition process. In other words, the one or more geometric features 131 may be substantially free of porosity.

The direct metal deposition tool 114 may include a closed-loop control system. For example, the direct metal deposition tool 114 may include sensors (not shown) that monitor operating conditions such as melt pool temperature, melt pool size, or other conditions. Data related to the operating conditions measured by the sensors may be sent to a direct metal deposition control processor (e.g., the CNC processor or a different processor), which may evaluate the data and increase or decrease the power provided to the heat source 116 to modify the temperature and/or size of the melt pool 124. In some embodiments, the closed-loop control system may include optical sensors, proximity sensors, distance sensors or other sensors to monitor the dimensions and geometry of the additional material 130 deposited by the direct metal deposition tool 114. Data from the sensors monitoring the dimensions and geometry of the additional material 130 may be sent to the CNC processor, and the CNC processor may alter the tool path of the direct metal deposition tool based on the data when the dimensions and geometry of the additional material 130 deviate a predetermined amount from design specifications (e.g., the dimensions and geometry specified by the electronic representation) of the earth-boring tool.

In some embodiments, the direct metal deposition tool 114 may comprise a 3D printer having associated therewith a material source configured to provide metal material 120 in the form of a precursor material, to be melted to sequentially form 3D-printed layers on a surface 126 of earth-boring tool component 110. The precursor material comprising metal material 120 may comprise, for example, powder from a reservoir delivered in a flowable medium (e.g., argon, nitrogen, air), a powder bed having a movable delivery column of metal powder and a distributor (e.g., a roller or pusher) to distribute quantities of the metal powder, a spool of metal powder embedded in a solid, destructible transport medium (e.g., wax, a polymer), or a spool of metal wire, or an extruded column of the metal material. Specific, nonlimiting examples of material sources of precursor materials for use in 3D printers are disclosed in U.S. Pat. No. 6,036,777, issued Mar. 14, 2000, to Sachs; U.S. Pat. No. 6,596,224, issued Jul. 22, 2003, to Sachs et al.; U.S. Patent App. Pub. No. 2005/0225007, published Oct. 13, 2005, to Lai et al.; U.S. Pat. No. 8,568,124, issued Oct. 29, 2013, to Brunermer. The 3D printer 104 may be configured to produce the 3D-printed layers by additive manufacturing techniques. For example, the 3D printer 104 may employ techniques previously set forth above, including micro-plasma powder deposition, selective laser melting, direct metal laser sintering, selective laser sintering, electron beam melting, as well as electron beam freeform fabrication. In addition, additional techniques including without limitation direct laser deposition, cold gas processing, laser cladding, direct material deposition, ceramic additive manufacturing, or binder jetting and subsequent sintering may be used to deposit metal material layer by layer to add a desired material to surface 126 of earth-boring tool component 110 comprising mutually bonded layers of at least partially melted metal material.

The 3D printer may include a focused heat source of sufficient power to at least partially melt metal and\or metal alloys components of metal material 120. The focused heat source may be, for example, a ytterbium-fiber optic laser, a carbon dioxide laser, or an electron beam emitter. A power rating of the focused heat source may be, for example, about 150 Watts or more. More specifically, the power rating of the focused heat source (e.g., the maximum power consumed by the focused heat source during operation) may be, for example, about 200 Watts or more. As a specific, nonlimiting example, the power rating of the focused heat source may be 300 Watts or more. Specific, nonlimiting embodiments of focused heat sources are disclosed in, for example, U.S. Pat. No. 8,344,283, issued Jan. 1, 2013, to Watanabe; U.S. Pat. No. 7,259,353, issued Aug. 21, 2007, to Guo; U.S. Patent App. Pub. No. 2005/0056628, published Mar. 17, 2005, to Hu.

In some embodiments, the earth-boring tool component 110 may be a partially formed earth-boring tool, for example, the shank of a rotary drill bit, formed using processes such as machining, casting, etc. In some embodiments, the earth-boring tool component 110 may be formed completely by direct metal deposition, and the earth-boring tool component 110 may represent a portion of an earth-boring tool formed during previous passes of the direct metal deposition tool 114. In other words, the earth-boring tool component 110 may be formed completely by the direct metal deposition tool 114.

Figures 5, 6:
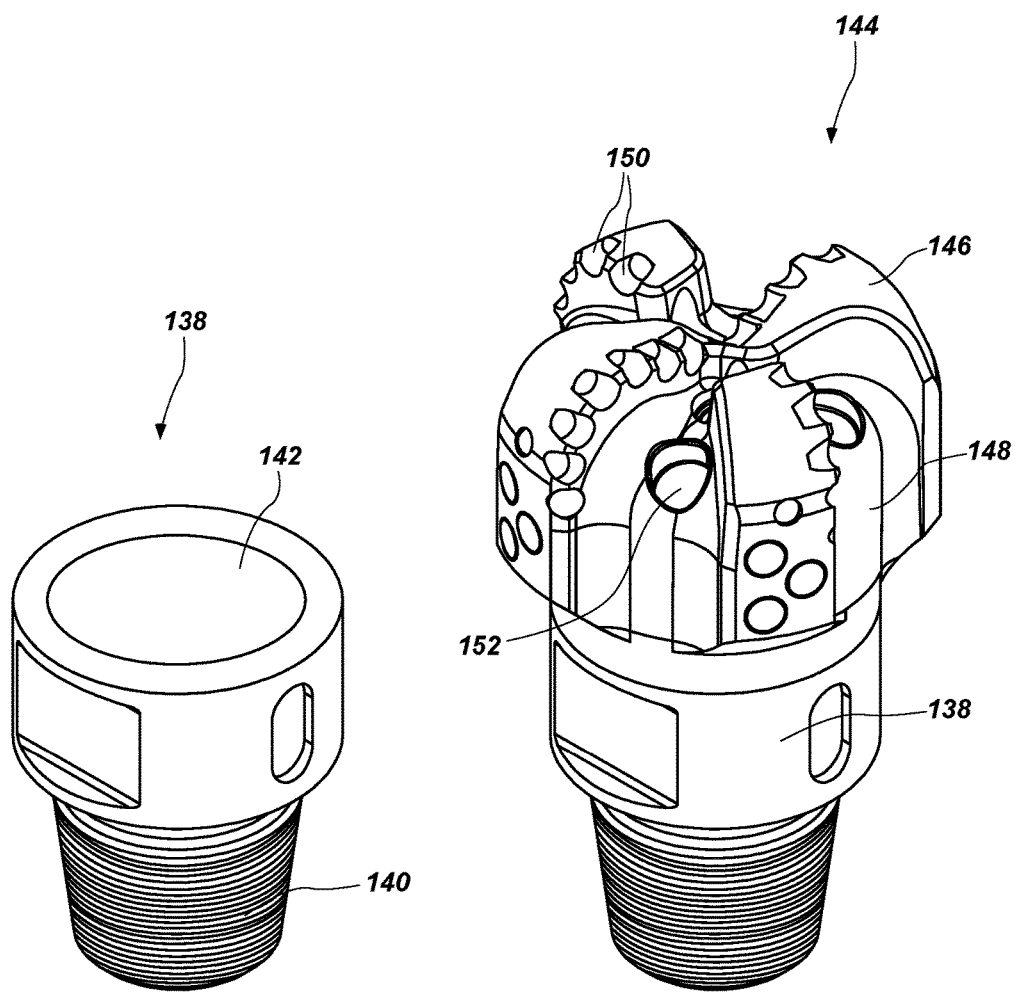
FIG. 5 is a perspective view of a portion of an earth-boring tool according to an embodiment of the disclosure.
FIG. 6 illustrates the portion of the earth-boring tool of FIG. 5 with additional features deposited by direct metal deposition.

At the completion of the direct metal deposition process, the earth-boring tool component 110 may have a near-net shape. In other words, the geometric features of the earth-boring tool component 110 formed by direct metal deposition may exhibit manufacturing tolerances that vary from design specifications of the earth-boring tool component 110 by less than the variance exhibited by some other forming processes (e.g., casting). Stated another way, the geometric so formed may be characterized as being formed to near net shape. Nevertheless, it may be necessary to perform subtractive manufacturing processes (e.g., machining) on one or more of the geometric features of the earth-boring tool component 110 created by the direct metal deposition process to achieve acceptable tolerances with respect to design specifications of the earth-boring tool component 110. For example, geometric features of the earth-boring tool component 110 may be finish machined by milling, drilling, routing, turning, etc. In some embodiments, finish machining operations may be used to form negative features of the earth-boring tool component 110, such as cutting element pockets 150 (FIG. 6) and fluid nozzle receptacles 152 (FIG. 6). Furthermore, depending on the resolution (e.g., the amount of material deposited in each pass by the direct metal deposition tool 114) of the direct metal deposition process, discontinuities 133 (e.g., "steps" between deposited portions) may exist on the surface of the geometric features of the earth-boring tool component 110. Subtractive manufacturing operations may be used to smooth the surface of the geometric feature 131 and at least partially remove the discontinuities 133.

Figure 3:
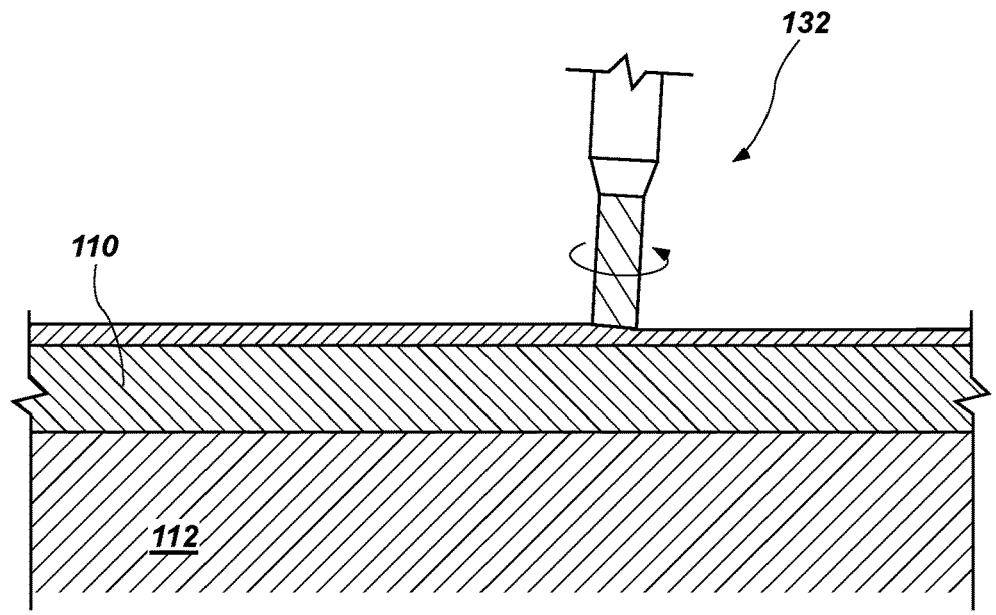
FIG. 3 is a side cross-sectional view of a subtractive machining process according to an embodiment of the disclosure.

In some embodiments, the earth-boring tool component 110 may remain affixed to the multi-axis positioner 112 during finish machining operations. For example, the gantry 122 (FIG. 2) may be moved (e.g., translated, pivoted) away from the earth-boring tool component 110, and a machine tool 132 (FIG. 3) may be moved into position to machine the earth-boring tool component 110. In the example of FIG. 3, the machine tool 132 shown is an end mill; however, other machine tools such as mills, drills, and other cutting tools may be used to machine the earth-boring tool component 110.

Figure 4:
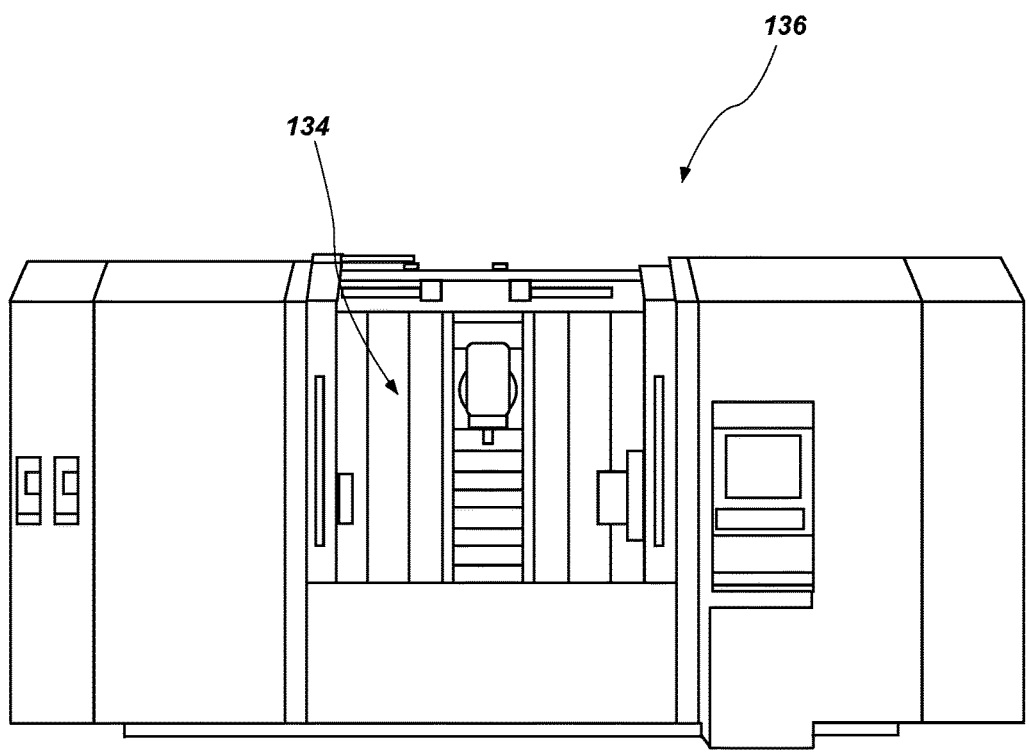
FIG. 4 is an elevation view of a machine tool according to an embodiment of the disclosure.

The direct metal deposition tool 114, the machine tool 132, the multi-axis positioner 112, and other tools may be associated with a single production station. For example, the direct metal deposition tool 114, the machine tool 132, and other machine tools may be affixed and operatively (e.g., mechanically, electronically) connected to a tool such as a multi-axis mill 136, as shown in FIG. 4. Thus, both additive manufacturing (e.g., material deposition with direct metal deposition tool 114) and subtractive manufacturing (e.g., machining with machine tool 132) processes may be performed on the earth-boring tool component 110 while the earth-boring tool component remains positioned within a working envelope 134 of the multi-axis mill 136. Suitable tools, e.g., multi-axis machine tools including at least a direct metal deposition tool and a machine tool, are available from, for example, DM3D Technology LLC, 2350 Pontiac Rd., Auburn Hills, Mich. USA; Optomec, 3911 Singer N. E., Albuquerque, N.M. USA; DMG Mori USA, 2400 Huntington Blvd., Hoffman Estates, Ill. USA; and Mazak Corp., 8025 Production Drive, Florence, Ky. USA. Such tools may be equipped with CNC capabilities as described above. For example, such tools may include a CNC processor configured to generate tool paths for one or more of the multi-axis positioner 112, the direct metal deposition tool 114, the machine tool 132, or other tools based on the electronic representation (e.g., 3-dimensional computer model) of the desired final geometry of the earth-boring tool component 110.

The direct metal deposition tool 114 (FIG. 2) may be used to apply one or more different metal materials to the earth-boring tool component 110. For example, the direct metal deposition tool 114 may be used to apply material having a composition similar or identical to a material of the earth-boring tool component 110. In some embodiments, the metallic material applied to the earth-boring tool component 110 and the material of the earth-boring tool component 110 may be a metal alloy such as steel, stainless steel, bronze, a nickel-based alloy, or other metal alloys.

In some embodiments, metal material 120 may include one or more metal materials, which may be delivered for deposition by direct metal deposition tool 114 in various forms. For example, metal material 120 may be supplied in various forms, such as in the form of fine particles of or a wire including metal and/or metal alloy material and may optionally further include one or more plastic, ceramic, and/or organic materials. More specifically, metal material 120 may include, for example, cobalt, nickel, copper, chromium, aluminum, iron, steel, stainless steel, titanium, tungsten, or alloys and mixtures thereof, magnetically responsive materials, polyetheretherketone (PEEK™), carbon-based materials (e.g., graphite, graphene, diamond, etc.), and/or glass. Specific, nonlimiting examples, of metal materials may include PA12-MD(A1), PA12-CF, PA11, 18 Mar 300/1.2709, 15-5/1.4540, 1.4404 (316L), Alloy 718, Alloy 625, CoCrMo, UNS R31538, Ti6AI4V and AlSi10Mg, Alloy 945x, 17-4/1.4542, Alloy 925, CrMnMoN-steel, CoCr Alloys (STELLITE®), CoNi Alloy, MP35 or equivalent, 4140, 4145, WC—Ni, WC—Co, and/or W. As another example, metal material may include fine particles of metal or metal alloy material intermixed with fine particles of ceramic material, the combination of materials being formulated to form a metallic-ceramic composite material (e.g., a cermet), in which ceramic particles are embedded within a metal or metal alloy matrix, upon melting and coalescence of the particles of metal and/or metal alloy material. More specifically, metal material 120 may be fine particles of cobalt, nickel, iron, steel, stainless steel, or alloys and mixtures thereof intermixed with fine particles of tungsten carbide, titanium carbide, tantalum carbide, molybdenum carbide, and other metal-carbide ceramic materials. Thus, as used herein, the term "metal material" includes without limitation, combinations of a metal or metal alloy with one or more additional materials.

In embodiments where the metal material 120 includes metal powder, an average particle size of particles of powdered material may be, for example, about 500 μm or less. More specifically, the average particle size of particles of powdered material in the metal material may be, for example, about 200 μm or less. As specific, nonlimiting examples, the average particle size of particles of powdered material in the metal material 120 may be between about 10 nm and about 500 nm, such as, for example, when nanoparticles or mostly nanoparticles are used (e.g., between about 20 nm and about 100 nm or between about 200 nm and about 350 nm); between about 500 nm and about 1 μm, such as, for example, when an at least substantially equal mixture of nanoparticles and microparticles is used (e.g., between about 750 nm and about 900 nm); or between about 1 μm and about 500 μm, such as, for example, when microparticles or mostly microparticles are used (e.g., between about 15 μm and about 45 μm or between about 50 μm and about 110 μm). In some embodiments, the particles of powdered material may exhibit a multi-modal (e.g., bi-modal, tri-modal, etc.) particle size distribution. In other embodiments, the particles of powdered material may exhibit a mono-modal particle size distribution. A volume percentage of particles of metal and/or metal alloy particles in the metal material 120 may be, for example, about 40% or less when the material in the metal material further includes particles of ceramic material. More specifically, the volume percentage of particles of metal and/or metal alloy particles in the metal material 120 may be, for example, about 30% or less when the material in the metal material 120 further includes particles of ceramic material. As a specific, nonlimiting example, the volume percentage of particles of metal and/or metal alloy particles in the metal material may be between about 5% and about 20% when the material in the metal material further includes particles of ceramic material.

The direct metal deposition tool 114 (FIG. 2) may also be used to apply materials different from a base material of the earth-boring tool component 110. For example, the direct metal deposition tool 114 may be used to apply metals or metal alloys having a different composition from the material of the earth-boring tool component 110. In other words, the earth-boring tool component 110 may comprise a metal alloy, e.g., steel, and the additional material 130 deposited by the direct metal deposition tool 114 may comprise a metal alloy different from that of the earth-boring tool component 110.

In some embodiments, the earth-boring tool component 110 may include hardfacing material to impart abrasion resistance to high-wear areas. The hardfacing material may comprise a particle-matrix composite material, such as particles of cemented tungsten carbide dispersed within a metal alloy matrix phase. Additionally or alternatively, the hardfacing material may comprise a metal alloy material such as a wear-resistant cobalt-chromium alloy (e.g., STELLITE®, available from Kennametal, Inc., Latrobe, Pa., USA).

Hardfacing material may be applied to the earth-boring tool component 110 in a similar manner to that described above in connection with the application of metal alloy material to the earth-boring tool component 110 in FIG. 2. For example, the heat source 116 may be used to form a melt pool 124 in the surface 126 of the earth-boring tool component 110, and the hardfacing material may be delivered in powdered form through the one or more deposition nozzles 118 of the direct metal deposition tool 114. Alternatively, in some embodiments, the heat source 116 may be configured to heat, but not necessarily melt, the surface 126 of the earth-boring tool component 110. Heat from the heat source 116 may directly melt the powdered hardfacing material, which may coalesce on the surface 126 of the earth-boring tool component 110. The CNC processor may determine a tool path for the direct metal deposition tool 114 to apply hardfacing material based on information regarding hardfacing material location included in the electronic representation of the earth-boring tool.

In embodiments with hardfacing material comprising a particle-matrix composite material, the particles of the hard material phase may have a higher melting point than the particles of the metal alloy matrix phase. Accordingly, when the direct metal deposition tool 114 is used to apply the particle-matrix composite hardfacing material, the particles of metal alloy matrix material may soften and/or melt under application of heat from the heat source 116 and coalesce into a substantially continuous metal alloy phase on the surface 126 of the earth-boring tool component 110 (FIG. 2). Hard material particles with a higher melting point than the particles of metal alloy matrix material may remain solid during deposition of the hardfacing material, and the deposited hardfacing material may comprise discrete particles of the hard material phase dispersed throughout the continuous metal phase.

In some embodiments, machining of the hardfacing material may be necessary to obtain acceptable dimensional tolerances. As hardfacing materials may be difficult to machine using conventional methods, an ultrasonic machine tool (e.g., ultrasonic machine tool 137 (FIG. 9)) may be used to machine the hardfacing material. Ultrasonic machining may include using an oscillating tool vibrating at ultrasonic frequencies to remove portions of the hardfacing and/or other materials of the earth-boring tool component 110. An abrasive slurry may be applied to the area to be machined to aid material removal by the oscillating tool.

In some embodiments, the earth-boring tool component 110 (FIG. 2) may remain affixed to the multi-axis positioner 112 (FIG. 2) during ultrasonic machining. For example, an ultrasonic machine tool (not shown) may be operatively (e.g., mechanically and/or electrically) coupled with the multi-axis mill 136 (FIG. 4). In some embodiments, the direct metal deposition tool 114 (FIG. 2) and the machine tool 132 (FIG. 4) may be moved (e.g., translated, pivoted) away from the earth-boring tool component 110, and the ultrasonic machine tool may be brought into contact with the earth-boring tool component 110 and operated to impart the desired shape and configuration to the earth-boring tool component 110. The ultrasonic machine tool may be controlled by the CNC processor and may be operated along a tool path generated by the CNC processor based on the electronic representation of the earth-boring tool.

Referring now to FIGS. 5 through 8, an embodiment of an earth-boring tool is shown during stages of a process according to an embodiment of the disclosure. Specifically, FIGS. 5 through 8 illustrate a rotary drag bit during various stages of a process according to the disclosure. FIG. 5 illustrates a shank 138 of an earth-boring tool. The shank 138 may be formed, for example, by machining a section of raw material such as steel bar stock in the multi-axis mill 136. The shank 138 may include a threaded connection portion 140, which may conform to industry standards, such as those promulgated by the American Petroleum Institute (API), for attaching the shank 138 to a drill string (not shown). A central opening 142 in the shank 138 may be in fluid communication with one or more fluid passages of the drill string.

FIG. 6 illustrates a partially formed rotary drag bit 144 with additional material deposited on the shank 138 (FIG. 5) by a direct metal deposition tool (e.g., direct metal deposition tool 114 (FIG. 2)) to form geometric features such as blades 146 and fluid courses 148 between the blades 146. Cutting element pockets 150 and fluid nozzle receptacles 152 may be formed by one or both of selective deposition of material with the direct metal deposition tool 114 and removal of material with the machine tool 132 (FIG. 3). Internal features such as fluid passageways (not shown) in communication with fluid nozzle receptacles 152 may also be formed by selective deposition and/or machining.

Figures 7, 8:
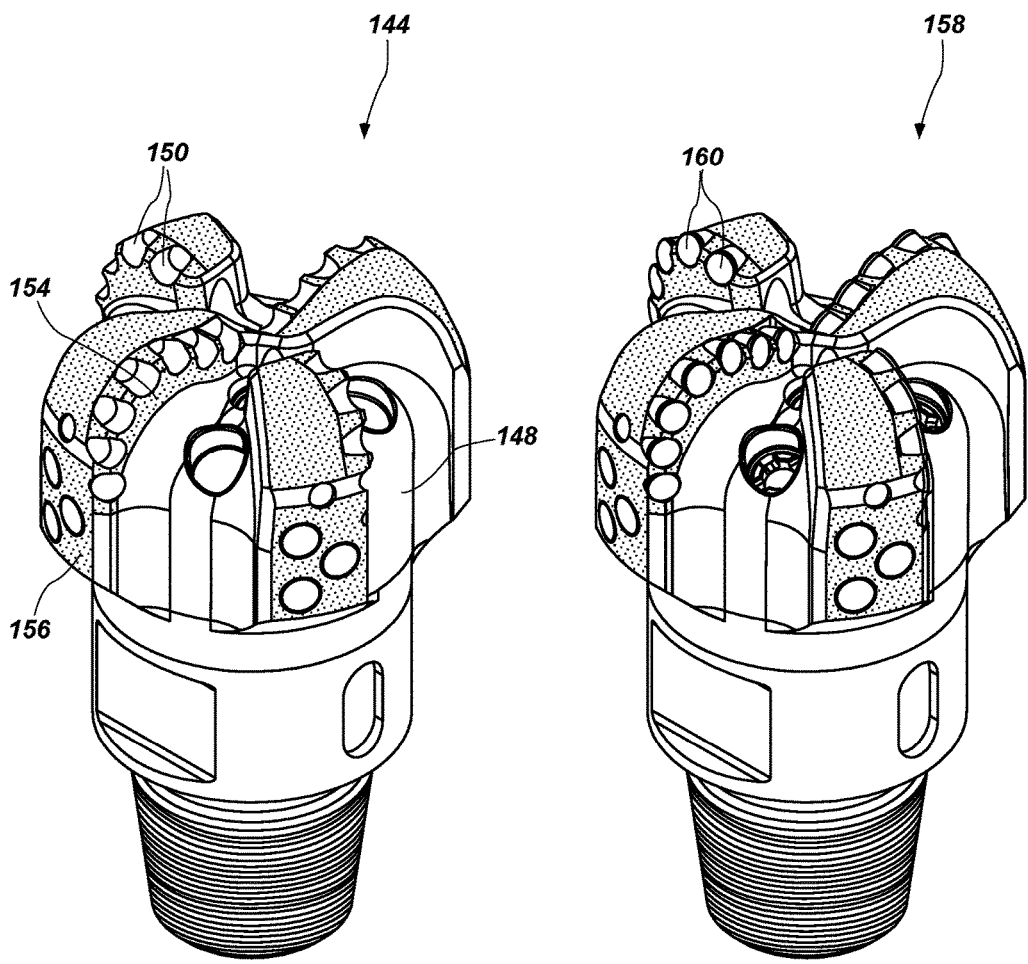
FIG. 7 illustrates the portion of the earth-boring tool of FIG. 6 with hardfacing applied by direct metal deposition.
FIG. 8 illustrates the portion of an earth-boring tool of FIG. 7 with cutting elements installed in recesses of the earth-boring tool.

Referring now to FIG. 7, hardfacing material 154 is applied to areas of the partially formed rotary drag bit 144 that are susceptible to wear. For example, hardfacing material 154 is applied to leading portions of the blades 146 and areas adjacent the cutting element pockets 150. Although not illustrated in FIG. 7, hardfacing material may also be applied to fluid courses 148, gage surfaces 156, additional surfaces of the blades 146, etc. The hardfacing material 154 may be applied by the direct metal deposition tool 114 (FIG. 2) following a tool path generated by the CNC processor, as described above. The hardfacing material 154 may be ultrasonically machined as described above to ensure the cutting element pockets 150 are sized within the desired range based on the design specifications and allowable tolerances.

FIG. 8 illustrates a substantially completed rotary drag bit 158. Cutting elements 160 may be brazed into the cutting element pockets 150 (FIGS. 6 and 7) using heat applied by the heat source 116 (FIG. 2) of the direct metal deposition tool 114 (FIG. 2). For example, the cutting elements 160 may be positioned within the cutting element pockets 150, and the heat source 116 may be used to heat and melt a metallic braze material. Capillary action may then draw the melted braze material into the space between each of the cutting element pockets 150 and a respective cutting element 160, and the braze material may solidify and retain the cutting elements 160 within the cutting element pockets 150. The braze material may be delivered in powdered form through the one or more deposition nozzles 118 (FIG. 2), or may be applied automatically or manually in the form of rods or wire.

While FIGS. 5 through 8 illustrate process stages of a method of forming a rotary drag bit, similar process acts may be used, in the order described, or in different orders or combinations of one or more of the acts described above, to form other earth-boring tools, such as roller-cone bits, hybrid bits, reamer blades, etc.

Figure 9:
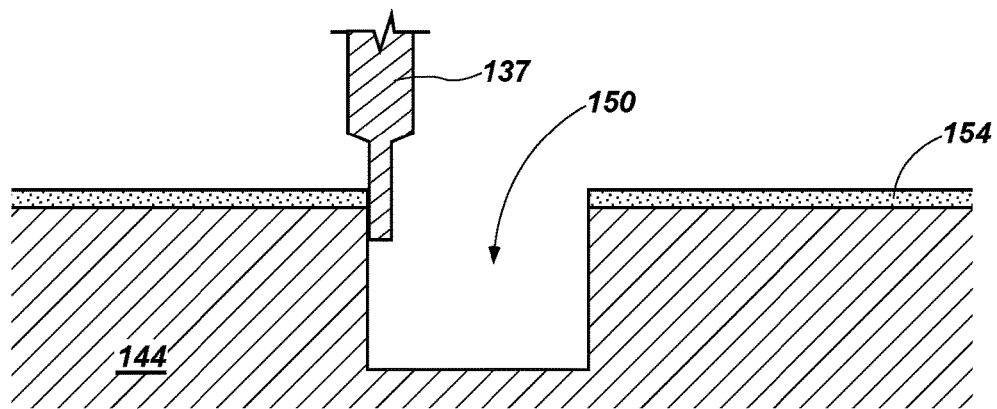
FIG. 9 is a side cross-sectional view of an ultrasonic machining process according to an embodiment of the disclosure.
Figure 10:
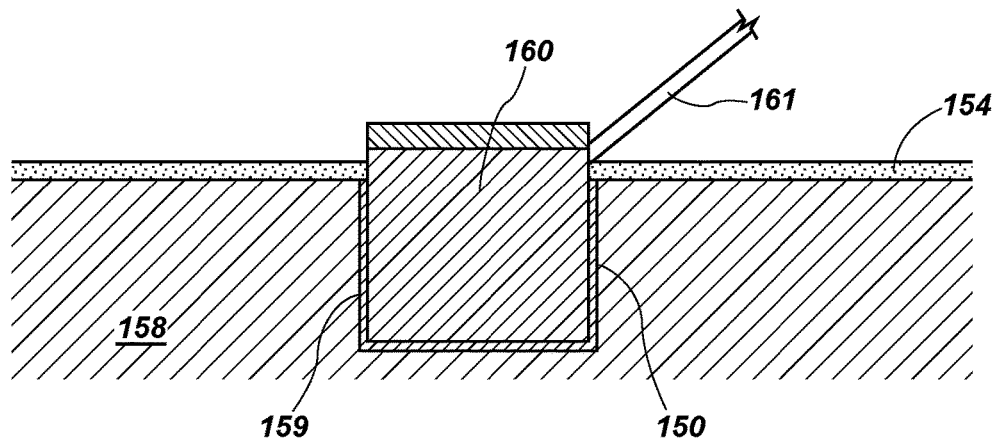
FIG. 10 is a side cross-sectional view of a brazing process according to an embodiment of the disclosure.

FIGS. 9 and 10 illustrate certain process acts discussed in connection with FIGS. 7 and 8 in greater detail. In FIG. 9, an ultrasonic machine tool 137 is operated (e.g., oscillated at ultrasonic frequencies) to machine hardfacing material 154 disposed on the body of the partially formed rotary drag bit 144 surrounding a cutting element pocket 150. As described above, the ultrasonic machine tool 137 may be operatively connected to the multi-axis CNC mill 136, and a tool path of the ultrasonic machine tool 137 may be generated by a CNC processor and at least partially based on an electronic representation of the partially formed rotary drag bit 144.

In FIG. 10, a cutting element 160 is placed within the cutting element pocket 150, and a braze material 159 is heated and melted using a heat source 161 and allowed to flow between surfaces of the cutting element pocket 150 and surfaces of the cutting element 160. In some embodiments, the heat source 161 may be a heat source of a direct metal deposition tool (e.g., heat source 116 of direct metal deposition tool 114 (FIG. 2)). As described above, the braze material 159 may be delivered through, e.g., nozzles 118 (FIG. 2) of the direct metal deposition tool 114. Upon removal of the heat source 161, the braze material 159 may be allowed to cool and solidify, thereby retaining the cutting element 160 within the cutting element pocket 150 as shown in FIG. 10.

Figure 11:
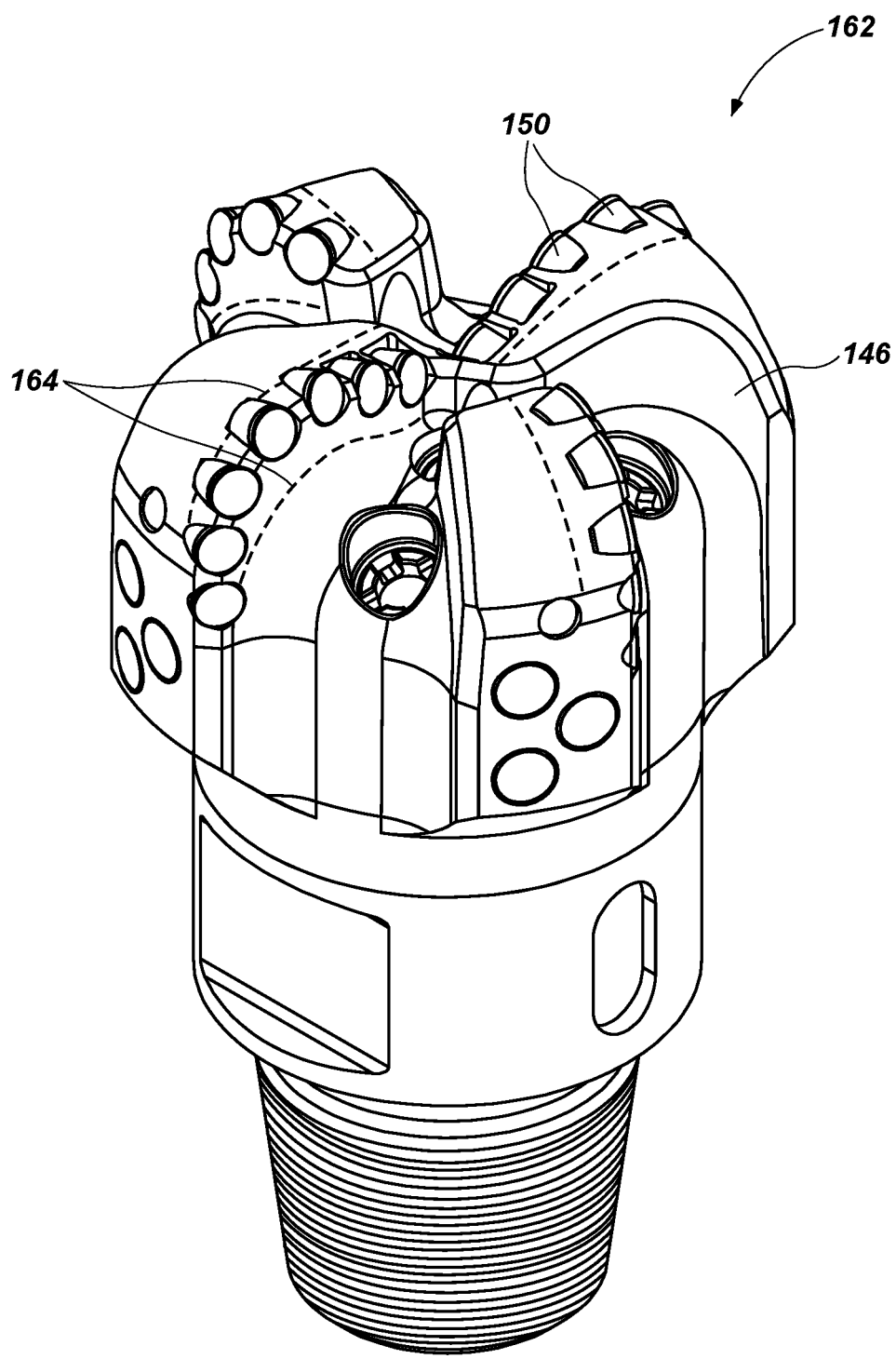
FIG. 11 is a perspective view of an embodiment of an earth-boring tool illustrating worn areas after use of the earth-boring tool.

In some embodiments, methods according to the disclosure include repairing a worn earth-boring tool. For example, referring now to FIG. 11, an earth-boring tool such as a rotary drag bit 162 may become worn (e.g., abraded, eroded) during use. Areas between dashed lines 164 may represent worn portions of the rotary drag bit 162 and may include, without limitation, leading portions of blades 146 and areas adjacent cutting element pockets 150. Other areas susceptible to wear, although not indicated by dashed lines 164, may include the fluid courses 148 (FIG. 7), gage surfaces 156 (FIG. 7), etc.

To repair the worn rotary drag bit 162, cutting elements 160 may be removed from cutting element pockets 150 by heating braze material to release each cutting element 160 from each respective cutting element pocket 150. Worn areas between dashed lines 164 may be built up using the direct metal deposition tool 114 (FIG. 2) and, if necessary, machined to a final profile. In some embodiments, a production tool such as the multi-axis mill 136 (FIG. 4) may be equipped with an optical scanning system (not shown) configured to generate an electronic representation of the actual shape of the worn rotary drag bit 162. The electronic representation of the actual shape of the worn rotary drag bit 162 may be compared to an electronic representation of a shape of the rotary drag bit 162 according to design specifications. For example, the electronic representation of the actual shape of the worn rotary drag bit 162 and an electronic representation of the design specifications of an associated unworn rotary drag bit may be entered in a processor of the multi-axis mill 136. The processor may compare the actual shape of the worn rotary drag bit 162 with the design specifications, and may develop a tool path for the direct metal deposition tool 114 to deposit material in appropriate areas to return the worn rotary drag bit 162 to the design specifications. The direct metal deposition tool 114 may apply a metal, metal alloy, hardfacing material, etc., as needed to the worn rotary drag bit 162 to achieve dimensions approaching design specifications, which may be characterized as near net shape dimensions, of the worn portion or portion of the rotary drag bit 162. Machining (e.g., milling, ultrasonic machining) as described above may be performed as necessary to the material applied by the direct metal deposition tool 114 to meet the design specifications. The cutting elements 160 may be replaced in the cutting element pockets 150 and brazed within the cutting element pockets 150 as described above. In some embodiments, machining may be performed on the worn areas to clean and/or profile the worn areas (e.g., impart to the worn areas a specified geometric shape) prior to application of material by the direct metal deposition tool 114.

Figure 12:
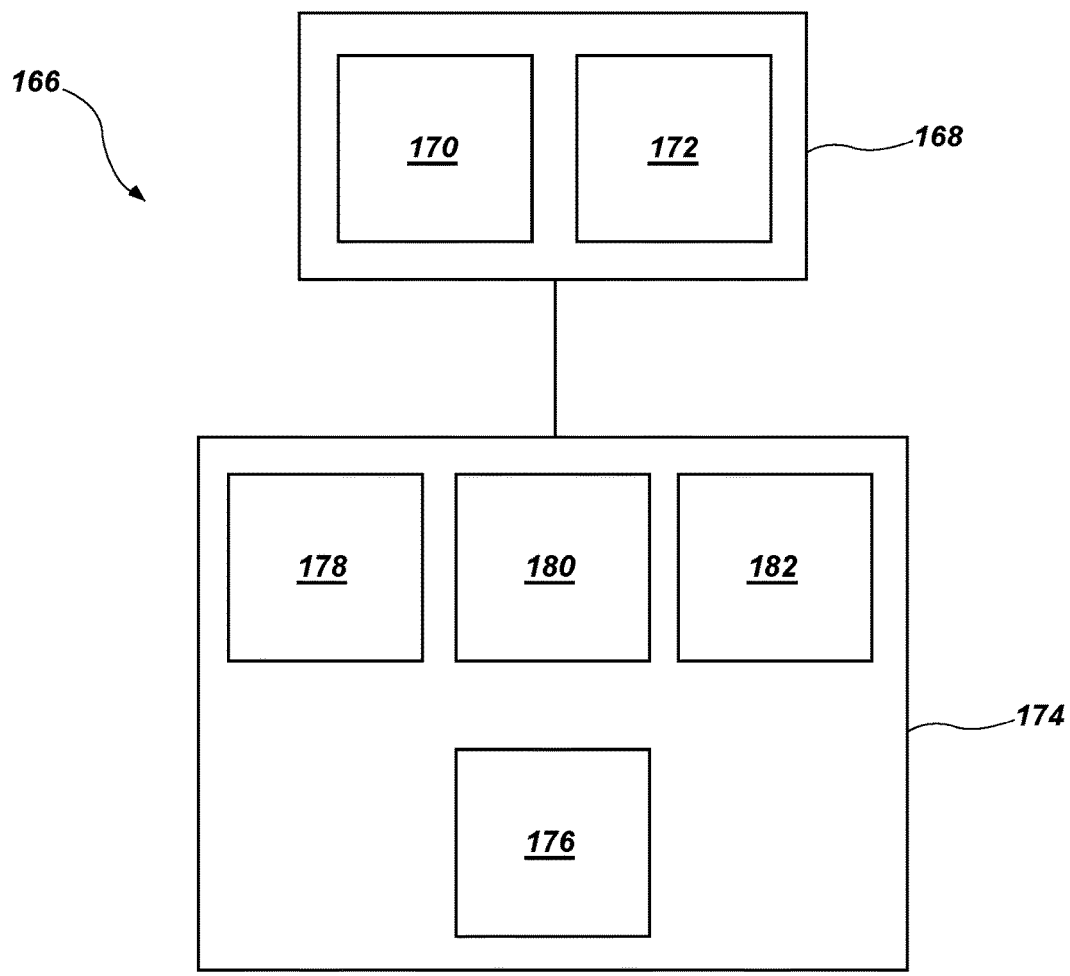
FIG. 12 is a schematic diagram of a manufacturing system according to an embodiment of the disclosure.

FIG. 12 shows a schematic diagram of a manufacturing system 166 according to the disclosure. The manufacturing system 166 may be or include, for example, the multi-axis CNC mill 136 (FIG. 4). The manufacturing system 166 may include a computer system 168 with memory 170 and a processor 172. Data containing a geometric representation of an earth-boring tool component (e.g., earth-boring tool component 110 (FIG. 2)) may be entered into the memory 170 of the computer system 168. The computer system 168 may be operatively connected to a CNC multi-axis machine tool 174, which may include, without limitation, at least one of a multi-axis positioner 176, a direct metal deposition tool 178 which, in some embodiments, may comprise a 3D printer, a machine tool 180, and an ultrasonic machine tool 182. Based on the data in the memory 170, the processor 172 may apply one or more software routines to generate tool paths for one or more of the multi-axis positioner 176, the direct metal deposition tool 178, the rotary machine tool 180, and the ultrasonic machine tool 182 to form an earth-boring tool component 110 as described above.

Compared to other methods of forming an earth-boring tool component, direct metal deposition processes may result in significantly less waste of material and smaller manufacturing tolerances, as well as the ability to custom-tailor component shapes and dimensions and to produce a variety of different earth-boring tools in limited numbers, or even a single tool of a particular design. Thus, the disclosed processes may enable cost-effective production of earth-boring tool components from relatively high-cost materials. For example, in some embodiments, the earth-boring tool component 110 (FIG. 2) may comprise so-called "superalloys," such as nickel-based (e.g., at least about forty percent (40%) by mass nickel) alloys. Reduction of waste due to excessive machining of metallic blanks may enable relatively economical use of costlier materials.

Furthermore, provision of the direct metal deposition tool 114 (FIG. 2), machine tool 132 (FIG. 2), and ultrasonic machine tool 137 (FIG. 9) or other tools within a single production station, e.g., multi-axis CNC mill 136 (FIG. 4), may reduce production time and associated cost by eliminating the need to manually or automatically transfer the earth-boring tool component between tools during production. For example, a complete earth-boring tool such as the rotary drag bit 158 (FIG. 8) may be manufactured from start to finish while remaining within the working envelope 134 (FIG. 4) of the multi-axis mill 136 and affixed to the multi-axis positioner 112.

Additional non-limiting example embodiments of the disclosure are set forth below.

Embodiment 1: A method of forming at least a portion of an earth-boring tool, the method comprising: entering an electronic representation of at least one geometric feature of at least a component of an earth-boring tool in a computer system including memory and a processor, the computer system operatively connected to a multi-axis positioning system, a direct metal deposition tool, and a material removal tool; generating, with the processor, a first tool path for the direct metal deposition tool, the first tool path based at least in part on the electronic representation of the at least one geometric feature of the at least a component of the earth-boring tool; operating the direct metal deposition tool along the first tool path to deposit metal on an earth-boring tool component coupled to the multi-axis positioning system to at least partially form the at least one geometric feature of the earth-boring tool; generating, with the processor, a second tool path for the material removal tool, the second tool path based at least in part on the electronic representation of the at least one geometric feature of the earth-boring tool; and operating the material removal tool along the second tool path to remove at least a portion of the deposited metal from the at least one geometric feature of the at least a component of the earth-boring tool.

Embodiment 2: The method of Embodiment 1, wherein operating the direct metal deposition tool along the first tool path to deposit metal on the at least a component of the earth-boring tool comprises: applying heat from a heat source to a portion of the at least a component of the earth-boring tool to form a melt pool on a surface of the earth-boring tool component; introducing a powdered metal material into the melt pool by directing a flow of powdered metal material through a deposition nozzle of the direct metal deposition tool; at least partially melting the powdered metal material with heat from one or both of the heat source and heat contained in the melt pool; and solidifying the melt pool and the at least partially melted powdered metal material to form a volume of metal material on the surface of the earth-boring tool component.

Embodiment 3: The method of Embodiment 2, wherein introducing the powdered metal material into the melt pool comprises introducing a powdered metal material comprising a composition substantially the same as a composition of a metal material of the at least a component of the earth-boring tool.

Embodiment 4: The method of Embodiment 2, wherein introducing the powdered metal material into the melt pool comprises introducing a powdered metal material comprising a composition different from a composition of a metal material of the at least a component of the earth-boring tool component.

Embodiment 5: The method of Embodiment 2, wherein introducing the powdered metal material into the melt pool comprises introducing a powdered metal material comprising an alloy composition comprising at least about forty percent (40%) nickel.

Embodiment 6: The method of any one of Embodiments 1 through 5, wherein operating the direct metal deposition tool along the first tool path to deposit metal on the at least a component of the earth-boring tool comprises: continuously obtaining information related to at least one of temperature of a melt pool formed by a heat source of the direct metal deposition tool and a size of the melt pool formed by the heat source of the direct metal deposition tool; and adjusting a power level of the heat source responsive to the information related to at least one of the temperature of the melt pool and the size of the melt pool.

Embodiment 7: The method of any one of Embodiments 1 through 6, wherein operating the direct metal deposition tool along the first tool path to deposit metal on the at least a component of the earth-boring tool coupled to the multi-axis positioning system to at least partially form the geometric feature of the earth-boring tool comprises at least one of rotating and translating the at least a component of the earth-boring tool by manipulating the multi-axis positioning system.

Embodiment 8: The method of any one of Embodiments 1 through 7, wherein operating the material removal tool along the second tool path to remove at least a portion of the deposited metal to form the geometric feature of the earth-boring tool comprises at least one of rotating and translating the at least a component of the earth-boring tool by manipulating the multi-axis positioning system.

Embodiment 9: The method of any one of Embodiments 1 through 8, wherein operating the material removal tool along the second tool path to remove at least a portion of the deposited metal to form the geometric feature of the at least a component of the earth-boring tool comprises operating a rotary milling tool along the second tool path to remove at least a portion of the deposited metal to form the geometric feature of the at least a component of the earth-boring tool.

Embodiment 10: The method of any one of Embodiments 1 through 9, wherein operating the direct metal deposition tool along the first tool path to deposit metal on the at least a component of the earth-boring tool to at least partially form the geometric feature of the at least a component of the earth-boring tool comprises depositing a plurality of layers of metal on the at least a component of the earth-boring tool to form a fully-dense geometric feature.

Embodiment 11: The method of any one of Embodiments 1 through 10, further comprising: generating a third tool path for the direct metal deposition tool; and operating the direct metal deposition tool along the third tool path to apply a hardfacing material to at least a portion of the at least a component of the earth-boring tool.

Embodiment 12: The method of Embodiment 11, wherein operating the direct metal deposition tool along the third tool path to apply a hardfacing material to at least a portion of the at least a component of the earth-boring tool comprises: introducing a powdered hardfacing material through a nozzle of the direct metal deposition tool to a location on a surface of the at least a component of the earth-boring tool proximate a heat source of the direct metal deposition tool; and applying the powdered hardfacing material to the surface of the at least a component of the earth-boring tool by at least partially melting the powdered hardfacing material with the heat source.

Embodiment 13: A method of forming a rotary drag bit, the method comprising: entering an electronic representation of a rotary drag bit in a computer system of a multi-axis milling machine, the computer system comprising memory and a processor; affixing a metal blank to a multi-axis positioner of the multi-axis milling machine; removing material from the metal blank by operating a milling tool along a milling tool path determined by the processor of the multi-axis milling machine based at least in part on the electronic representation of the rotary drag bit to form a shank of the rotary drag bit including a threaded portion for connection to a drill string; depositing metal material on the shank of the rotary drag bit by operating a direct metal deposition tool along a first deposition tool path determined by the processor of the multi-axis milling machine based at least in part on the electronic representation of the rotary drag bit to form a geometric feature of the rotary drag bit including at least a portion of a blade on the shank of the rotary drag bit; and depositing a hardfacing material on the at least a portion of the blade of the rotary drag bit by operating a direct metal deposition tool along a hardfacing tool path determined by the processor of the multi-axis milling machine based at least in part on the electronic representation of the rotary drag bit to form at least one hardfaced area on the at least a portion of the blade of the rotary drag bit.

Embodiment 14: The method of Embodiment 13, further comprising removing at least a portion of the hardfacing material from the at least one hardfaced area to form at least one cutting element pocket in the at least a portion of the blade of the rotary drag bit.

Embodiment 15: The method of Embodiment 14, wherein removing at least a portion of the hardfacing material from the at least one hardfaced area to form at least one cutting element pocket in the at least a portion of the blade of the rotary drag bit comprises operating an ultrasonic machine tool along an ultrasonic machine tool path determined by the processor of the multi-axis milling machine based at least in part on the electronic representation of the rotary drag bit.

Embodiment 16: The method of Embodiment 15, further comprising: positioning a cutting element in the cutting element pocket; introducing a braze material to an interface between the cutting element and the cutting element pocket; melting the braze material by applying heat from a heat source to one or both of the braze material and the interface; and solidifying the braze material to retain the cutting element within the cutting element pocket.

Embodiment 17: The method of Embodiment 16, wherein introducing the braze material to an interface between the cutting element and the cutting element pocket comprises introducing the braze material to an interface between the cutting element and the cutting element pocket by directing a powdered braze material through a deposition nozzle of the direct metal deposition tool.

Embodiment 18: A method of repairing an earth-boring tool, the method comprising: generating an electronic representation of the shape of a worn earth-boring tool; using a computer system, comparing the electronic representation of the shape of the worn earth-boring tool to an electronic representation of a shape of the earth-boring tool in an unworn state based on design specifications associated with the earth-boring tool to identify worn areas of the earth-boring tool; using a computer system, generating a tool path based on a difference between the compared shape of the worn earth-boring tool and the shape of the earth-boring tool in an unworn state based on the design specifications of the earth-boring tool; and operating a direct metal deposition tool along the tool path to build up worn areas of the worn earth-boring tool to meet the design specifications.

Embodiment 19: The method of Embodiment 18, wherein generating an electronic representation of the shape of the worn earth-boring tool comprises: positioning the worn earth-boring tool within a working envelope of a multi-axis milling machine; and scanning the shape of the worn earth-boring tool with an optical scanning tool operatively connected to the multi-axis milling machine.

Embodiment 20: The method of Embodiment 19, wherein operating the direct metal deposition tool along the tool path comprises operating a direct metal deposition tool operatively connected to the multi-axis milling machine while the worn earth-boring tool is positioned within the working envelope of the multi-axis milling machine.

Embodiment 21: A method of altering at least one dimension of at least a portion of an earth-boring tool using an electronic representation of at least one geometric feature of at least a portion of a component of an earth-boring tool using a multi-axis positioning system, a direct metal deposition apparatus, and a material removal apparatus, the method comprising: generating, with a processor and based at least in part on the electronic representation, a deposition path for deposition of metal material by the direct metal deposition apparatus; depositing metal material according to the generated deposition path using the direct metal deposition apparatus on an earth-boring tool component related to the electronic representation and coupled to the multi-axis positioning system; generating, with the processor and based at least in part on the electronic representation, a removal path for the material removal apparatus; and removing at least a portion of the deposited metal material according to the generated removal path using the material removal apparatus from the earth-boring tool component.

Embodiment 22: The method of Embodiment 21, wherein depositing metal material according to the generated deposition path using the direct metal deposition apparatus further comprises: applying heat from a heat source to a portion of a surface of the earth-boring tool component; introducing a metal material onto the heated portion of the component surface by depositing the metal material with the direct metal deposition apparatus; at least partially melting the metal material with heat from one or both of the heat source and the heated surface; and solidifying the at least partially melted metal material to form a volume of metal material on the surface of the earth-boring tool component.

Embodiment 23: The method of Embodiment 22, wherein introducing the metal material onto the heated portion of the component surface comprises introducing a metal material comprising a composition substantially the same as a composition of a metal material of the earth-boring tool component.

Embodiment 24: The method of Embodiment 22, wherein introducing the metal material onto the heated portion of the component surface comprises introducing a metal material comprising a composition different from a composition of a metal material of the earth-boring tool component.

Embodiment 25: The method of Embodiment 22, wherein introducing the metal material onto the heated portion of the component surface comprises introducing a metal material comprising one or more of cobalt, nickel, copper, chromium, aluminum, iron, steel, stainless steel, titanium, tungsten, or alloys and mixtures thereof, magnetically responsive materials, polyetheretherketone (PEEK'), carbon-based materials, glass, and metal-carbide ceramic materials.

Embodiment 26: The method of Embodiment 21, wherein depositing metal material according to the generated deposition path using the direct metal deposition apparatus further comprises: continuously obtaining information related to at least one of temperature of a surface of the earth-boring tool component heated by a heat source and a size of the heated surface heated by the heat source; and adjusting a power level of the heat source responsive to the information related to at least one of the temperature of the heated surface and the size of the heated surface.

Embodiment 27: The method of Embodiment 21, wherein depositing metal material according to the generated deposition path using the direct metal deposition apparatus on the earth-boring tool component to alter at least one dimension of the earth-boring tool component comprises at least one of rotating and translating the earth-boring tool component with the multi-axis positioning system.

Embodiment 28: The method of Embodiment 21, wherein removing at least a portion of the deposited metal material according to the generated removal path using the material removal apparatus from the earth-boring tool component to further alter at least one dimension of the earth-boring tool component comprises at least one of rotating and translating the at least a component of the earth-boring tool with the multi-axis positioning system.

Embodiment 29: The method of Embodiment 21, wherein removing at least a portion of the deposited metal material according to the generated removal path using the material removal apparatus from the earth-boring tool component to further alter at least one dimension of the earth-boring tool component comprises operating a rotary milling tool along the removal path.

Embodiment 30: The method of Embodiment 21, wherein depositing metal material according to the generated deposition path using the direct metal deposition apparatus on the earth-boring tool component comprises depositing a plurality of layers of metal material on the earth-boring tool component to form a fully-dense geometric feature.

Embodiment 31: The method of Embodiment 21, further comprising: generating another deposition path for the direct metal deposition apparatus; and applying a hardfacing material to the earth-boring tool component along another generated deposition path using the direct metal deposition apparatus.

Embodiment 32: The method of Embodiment 31, wherein applying a hardfacing material to the earth-boring tool component along the another generated deposition path using the direct metal deposition apparatus further comprises: introducing a hardfacing material with the direct metal deposition apparatus to at least one location on a surface of the earth-boring tool component to the at least one location heated by output of a heat source directed to the at least one location; and at least partially melting the powdered hardfacing material with the heat source.

Embodiment 33: The method of Embodiment 21, wherein depositing metal material according to the generated deposition path using the direct metal deposition apparatus comprises micro-plasma powder deposition, selective laser melting, direct metal laser sintering, selective laser sintering, electron beam melting, electron beam freeform fabrication direct laser deposition, cold gas processing, laser cladding, direct material deposition, ceramic additive manufacturing, or binder jetting and subsequent sintering.

Embodiment 34: The method of Embodiment 33, wherein depositing metal material according to the generated deposition path using the direct metal deposition apparatus comprises using a 3D printer.

Embodiment 35: The method of Embodiment 21, wherein depositing metal material according to the generated deposition path using the direct metal deposition apparatus comprises using a 3D printer.

Embodiment 36: The method of Embodiment 21, wherein depositing metal material comprises depositing a metal material powder from a reservoir delivered in a flowable gaseous medium, using a powder bed having a movable delivery column of metal material powder and a distributor to distribute quantities of the metal material powder, using a spool of metal material powder embedded in a solid, destructible transport medium, using a spool of metal material wire, or using an extruded column of the metal material.

Embodiment 37: The method of Embodiment 21, wherein altering at least one dimension of an earth-boring tool component comprises one of: depositing at least one metal material according to the generated deposition path to form at least a portion of the earth-boring tool component to a near net shape state; or depositing at least one metal material according to the generated deposition path to repair at least a worn portion of the earth-boring tool component to a near net shape state.

Embodiment 38: The method of Embodiment 21, further comprising removing metal material of the earth-boring tool component with the material removal apparatus.

Embodiment 39: The method of Embodiment 38, wherein removing metal material of the earth-boring tool component with the material removal apparatus comprises forming an aperture through the deposited metal material and into the metal material of the earth-boring component, and inserting a portion of a cutting element into the aperture.

Embodiment 40: The method of Embodiment 39, further comprising securing the portion of the cutting element within the aperture to the earth-boring tool component.

Although the foregoing description and accompanying drawings contain many specifics, these are not to be construed as limiting the scope of the disclosure, but merely as describing certain embodiments. Similarly, other embodiments may be devised, which do not depart from the spirit or scope of the disclosure. For example, features described herein with reference to one embodiment also may be provided in others of the embodiments described herein. The scope of the invention is, therefore, indicated and limited only by the appended claims and their legal equivalents. All additions, deletions, and modifications to the disclosed embodiments, which fall within the meaning and scope of the claims, are encompassed by the disclosure.

What is claimed is:

1. A method of altering at least one dimension of at least a component of an earth-boring tool using an electronic representation of at least one geometric feature of the at least a component of the earth-boring tool stored in memory accessible by a processor operatively connected to a multi-axis positioning system, a direct metal deposition apparatus, and a material removal apparatus, the method comprising:

generating, with the processor and based at least in part on the electronic representation, a deposition path for deposition of metal material by the direct metal deposition apparatus;

depositing metal material according to the generated deposition path using the direct metal deposition apparatus on an earth-boring tool component related to the electronic representation and coupled to the multi-axis positioning system to alter at least one dimension of the at least a component of the earth-boring tool;

generating, with the processor and based at least in part on the electronic representation, a removal path for the material removal apparatus; and removing at least a portion of the deposited metal material from the at least a component of the earth-boring tool according to the generated removal path using the material removal apparatus to further alter the at least one dimension of the at least a component of the earth-boring tool.

2. The method of claim 1, wherein depositing metal material according to the generated deposition path using the direct metal deposition apparatus further comprises:

applying heat from a heat source to a portion of a surface of the at least a component of the earth-boring tool;

introducing a metal material onto the heated portion of the surface by directing deposition of the metal material with the direct metal deposition apparatus;

at least partially melting the metal material with heat from one or both of the heat source and the heated portion of the surface; and solidifying the at least partially melted metal material to form a volume of metal material on the surface.

3. The method of claim 2, wherein introducing the metal material onto the heated portion of the surface comprises introducing a metal material comprising a composition substantially the same as a composition of a metal material of the at least a component of the earth-boring tool.

4. The method of claim 2, wherein introducing the metal material onto the heated portion of the surface comprises introducing a metal material comprising a composition different from a composition of a metal material of the at least a component of the earth-boring tool.

5. The method of claim 2, wherein introducing the metal material onto the heated portion of the surface comprises introducing a metal material comprising one or more of cobalt, nickel, copper, chromium, aluminum, iron, steel, stainless steel, titanium, tungsten, or alloys and mixtures thereof, magnetically responsive materials, polyetheretherketone (PEEK™), carbon-based materials, glass, and metal-carbide ceramic materials.

6. The method of claim 1, wherein depositing metal material according to the generated deposition path using the direct metal deposition apparatus further comprises:

continuously obtaining information related to at least one of temperature of a surface of the at least a component of the earth-boring tool heated by a heat source and a size of the heated surface heated by the heat source; and adjusting a power level of the heat source responsive to the information related to at least one of the temperature of the heated surface and the size of the heated surface.

7. The method of claim 1, wherein depositing metal material according to the generated deposition path using the direct metal deposition apparatus on the earth-boring tool component to alter at least one dimension of the at least a component of the earth-boring tool comprises at least one of rotating and translating the at least a component of the earth-boring tool with the multi-axis positioning system.

8. The method of claim 1, wherein removing at least a portion of the deposited metal material according to the generated removal path using the material removal apparatus from the at least a component of the earth-boring tool to further alter at least one dimension of the at least a component of the earth-boring tool comprises at least one of rotating and translating the at least a component of the earth-boring tool with the multi-axis positioning system.

9. The method of claim 1, wherein removing at least a portion of the deposited metal material according to the generated removal path using the material removal apparatus from the at least a component of the earth-boring tool to further alter at least one dimension of the at least a component of the earth-boring tool comprises operating a rotary milling tool along the removal path.

10. The method of claim 1, wherein depositing metal material according to the generated deposition path using the direct metal deposition apparatus on the at least a component of the earth-boring tool comprises depositing a plurality of layers of metal material on the earth-boring tool component to form a fully-dense geometric feature.

11. The method of claim 1, further comprising:
generating another deposition path for the direct metal deposition apparatus; and
applying a hardfacing material to the at least a component of the earth-boring tool along the another generated deposition path using the direct metal deposition apparatus.

12. The method of claim 11, wherein applying a hardfacing material to the at least a component of the earth-boring tool along the another generated deposition path using the direct metal deposition apparatus further comprises:
introducing a hardfacing material with the direct metal deposition apparatus to at least one location on a surface of the at least a component of the earth-boring tool to the at least one location heated by output of a heat source directed to the at least one location; and
at least partially melting a powdered hardfacing material with the heat source.

13. The method of claim 1, wherein depositing metal material according to the generated deposition path using the direct metal deposition apparatus comprises micro-plasma powder deposition, selective laser melting, direct metal laser sintering, selective laser sintering, electron beam melting, electron beam freeform fabrication direct laser deposition, cold gas processing, laser cladding, direct material deposition, ceramic additive manufacturing, or binder jetting and subsequent sintering.

14. The method of claim 13, wherein depositing metal material according to the generated deposition path using the direct metal deposition apparatus comprises using a 3D printer.

15. The method of claim 1, wherein depositing metal material according to the generated deposition path using the direct metal deposition apparatus comprises using a 3D printer.

16. The method of claim 1, wherein depositing metal material comprises depositing a metal material powder from a reservoir delivered in a flowable gaseous medium, using a powder bed having a movable delivery column of metal material powder and a distributor to distribute quantities of the metal material powder, using a spool of metal material powder embedded in a solid, destructible transport medium, using a spool of metal material wire, or using an extruded column of the metal material.

17. The method of claim 1, wherein altering at least one dimension of at least one component of an earth-boring tool comprises one of:
depositing at least one metal material according to the generated deposition path to form at least a portion of the at least a component of the earth-boring tool to a near net shape state; or
depositing at least one metal material according to the generated deposition path to repair at least a worn portion of the at least a component of the earth-boring tool to a near net shape state.

18. The method of claim 1, further comprising removing metal material of the at least a component of the earth-boring tool with the material removal apparatus.

19. The method of claim 18, wherein removing metal material of the at least a component of the earth-boring tool with the material removal apparatus comprises forming an aperture through the deposited metal material and into the metal material of the at least a component of the earth-boring, and inserting a portion of a cutting element into the aperture.

20. The method of claim 19, further comprising securing the portion of the cutting element within the aperture to the at least a component of the earth-boring tool.

* * * * *